United States Patent
Choi et al.

(10) Patent No.: US 10,131,728 B2
(45) Date of Patent: Nov. 20, 2018

(54) ACRYLIC SYRUP PREPARATION METHOD AND ACRYLIC SYRUP

(71) Applicant: LG Chem, Ltd., Seoul (KR)

(72) Inventors: Jun-Man Choi, Seoul (KR); Jang-Soon Kim, Gyeonggi-do (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/509,693

(22) PCT Filed: Sep. 23, 2015

(86) PCT No.: PCT/KR2015/010038
§ 371 (c)(1),
(2) Date: Mar. 8, 2017

(87) PCT Pub. No.: WO2016/052915
PCT Pub. Date: Apr. 7, 2016

(65) Prior Publication Data
US 2017/0283535 A1   Oct. 5, 2017

(30) Foreign Application Priority Data

Sep. 29, 2014 (KR) .......................... 10-2014-0130550

(51) Int. Cl.
| | |
|---|---|
| *C08F 2/46* | (2006.01) |
| *C08F 2/50* | (2006.01) |
| *C08G 61/04* | (2006.01) |
| *C08F 220/18* | (2006.01) |
| *C08F 20/18* | (2006.01) |
| *C08F 2/02* | (2006.01) |
| *C08F 2/48* | (2006.01) |
| *C09D 4/00* | (2006.01) |

(52) U.S. Cl.
CPC .............. *C08F 220/18* (2013.01); *C08F 2/02* (2013.01); *C08F 2/48* (2013.01); *C08F 2/50* (2013.01); *C08F 20/18* (2013.01); *C09D 4/00* (2013.01); *C08F 2220/1808* (2013.01); *C08F 2220/1841* (2013.01); *C08F 2220/1858* (2013.01)

(58) Field of Classification Search
CPC ............ C08F 220/18; C08F 2220/1841; C08F 2220/1808
USPC ............... 522/46, 33, 6, 71, 189, 184; 520/1
See application file for complete search history.

(56) References Cited

U.S. PATENT DOCUMENTS

| | | | |
|---|---|---|---|
| 4,303,485 A | 12/1981 | Levens | |
| 6,191,229 B1 | 2/2001 | Sasabe et al. | |
| 2002/0025992 A1 | 2/2002 | Baba et al. | |
| 2003/0008140 A1* | 1/2003 | Takizawa ........... | C08G 18/6254 428/355 EP |
| 2010/0112201 A1* | 5/2010 | McGuire, Jr. ......... | C08F 120/18 427/207.1 |
| 2014/0154500 A1* | 6/2014 | Araki ........................ | C09J 4/00 428/317.3 |

FOREIGN PATENT DOCUMENTS

| | | | |
|---|---|---|---|
| JP | H073212 A | 1/1995 | |
| JP | H083224 A | 1/1996 | |
| JP | H09104702 A | 4/1997 | |
| JP | 2001305733 A | 11/2001 | |
| JP | 2009-079204 | * 4/2009 | |
| JP | 2011231162 A | 11/2011 | |
| JP | 2014-009314 | * 1/2014 | |
| JP | 2014009314 A | 1/2014 | |
| KR | 20070007974 A | 1/2007 | |
| KR | 20140035360 A | 3/2014 | |
| WO | WO-2012153795 A1 | * 11/2012 | ................ C09J 4/00 |
| WO | 2014013028 A1 | 1/2014 | |

OTHER PUBLICATIONS

Shimazaki et al, JP 2009-079204 Machine Translation, Apr. 16, 2009 (Year: 2009).*
Matsumura et al, JP 2014-009314 Machine Translation part 1, Jan. 20, 2014 (Year: 2014).*
Matsumura et al, JP 2014-009314 Machine Translation part 2, Jan. 20, 2014 (Year: 2014).*
International Search Report from PCT/KR2015/010038, dated Jan. 20, 2016.

* cited by examiner

*Primary Examiner* — Jessica Whiteley
(74) *Attorney, Agent, or Firm* — Lerner, David, Littenberg, Krumholz & Mentlik, LLP

(57) ABSTRACT

Provided is an acrylic syrup preparation method including the steps of: performing bulk photopolymerization by initiating a UV irradiation of a composition containing a photoinitiator and one or more types of acrylic monomers; stopping the UV irradiation at the time point when the temperature is increased by about 5° C. to about 40° C. from the time point when the temperature at which the UV irradiation of the composition is initiated; and purging the composition with an oxygen-containing inert gas after the UV irradiation is stopped.

17 Claims, 1 Drawing Sheet

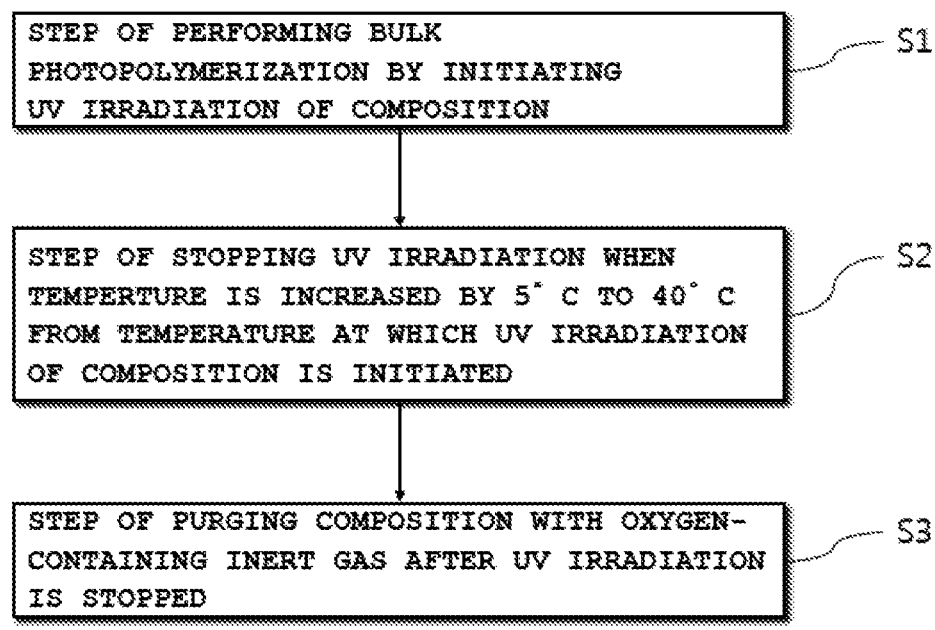

ACRYLIC SYRUP PREPARATION METHOD AND ACRYLIC SYRUP

CROSS-REFERENCE TO RELATED APPLICATIONS

This application is a national phase entry under 35 U.S.C. § 371 of International Application No. PCT/KR2015/010038, filed Sep. 23, 2015, which claims priority to Korean Patent Application No. 10-2014-0130550, filed Sep. 29, 2014, the disclosures of which are incorporated herein by reference.

TECHNICAL FIELD

The present invention relates to an acrylic syrup preparation method and an acrylic syrup.

BACKGROUND ART

Acrylic syrups have transparency, and cured products obtained by curing the acrylic syrups easily adjust adhesive strength for various base materials and have been used for various uses such as an adhesive sheet, an adhesive film, a protective coating, a foam, and an adhesive.

Examples of a polymerization method for preparing the acrylic syrup include a solution polymerization, an emulsion polymerization, and the like, and the solution polymerization has a problem in that an organic solvent remains in the acrylic syrup, which may generate odor, fire, explosion, and the like, and the case of removing the solvent by evaporating the solvent into the atmosphere causes atmospheric contamination, which is hazardous to the environment. Further, in the case of the emulsion polymerization, an organic solvent is not used, but after a polymer is synthesized, the polymer may not be used as it is, and an additive such as a neutralizer, a wetting agent, a thickener, and a disinfectant needs to be added in a large amount, and the addition process is also complicated, and a large amount of waste water is generated because a large amount of water is used in the process of washing a reactor after the synthesis is completed.

For this reason, eco-friendliness, high yield, and economic efficiency may be achieved by using bulk polymerization, and examples of the bulk polymerization include bulk thermal polymerization which is initiated by heat or bulk photopolymerization which is initiated by light.

In the case of the bulk thermal polymerization, the productivity is low due to the relatively slow reaction rate, and the polymerization is continuously performed to some degree at normal temperature even after the temperature is lowered, and as a result, physical properties may vary.

Meanwhile, in the case of the bulk photopolymerization, the productivity is high due to the fast reaction rate, but since the reaction may explosively occur and it is difficult to uniformly prepare an acrylic syrup having a desired level of conversion rate, a molecular weight adjusting agent and the like have been essentially used in order to solve the problems. However, since the above-described molecular weight adjusting agent and the like remain in the prepared acrylic syrup, and still remain even after the acrylic syrup as an adhesive film, a protective coating, and a foam is applied to a product, there occurs a migration phenomenon in which a molecular weight adjusting agent having fluidity, and the like migrate to a surface of the product, and since residue of an adhesive, dirt, and the like may be generated, there is a problem in that the surface appearance and the performance of the product may deteriorate.

DETAILED DESCRIPTION OF THE INVENTION

Technical Problem

An exemplary embodiment of the present invention provides an acrylic syrup preparation method, which may implement excellent eco-friendliness, excellent productivity, excellent storage stability, excellent surface appearance, and uniform performance.

Another exemplary embodiment of the present invention provides an acrylic syrup prepared by the preparation method.

Technical Solution

An exemplary embodiment of the present invention provides an acrylic syrup preparation method including the steps of: performing bulk photopolymerization by initiating a UV irradiation of a composition containing a photoinitiator and one or more types of acrylic monomers; stopping the UV irradiation at the time point when the temperature is increased by about 5° C. to about 40° C. from at the time point when the temperature at which the UV irradiation of the composition is initiated; and purging the composition with an oxygen-containing inert gas after the UV irradiation is stopped.

The oxygen-containing inert gas may contain oxygen in an amount of about 10 vol % to about 30 vol %.

Stirring may be carried out at least while the composition is purged with the oxygen-containing inert gas.

The composition may be purged with the oxygen-containing inert gas until the time point when the temperature of the composition reaches at least about 20° C. to about 50° C.

The composition may not include a molecular weight adjusting agent.

The acrylic monomers may be polymerized at a conversion rate of about 4% to about 20% until the time point when the UV irradiation is stopped.

An acrylic polymer having a weight average molecular weight of about 1,000,000 g/mol to about 20,000,000 g/mol may be formed by the bulk photopolymerization until the time point when the UV irradiation is stopped.

A nitrogen purging of the composition may be started and carried out from before the UV irradiation is initiated.

Stirring may be carried out at least while the composition is purged with nitrogen.

The temperature of the composition may be set to about −10° C. to about 80° C. at the time point when the UV irradiation is initiated.

The method may further include: the step of preparing the composition by mixing the photoinitiator in an amount of about 0.001 part by weight to about 1 part by weight based on about 100 parts by weight of the one or more types of acrylic monomers.

The one or more types of acrylic monomers may include at least one selected from the group consisting of a (meth)acrylic acid ester-based monomer which includes an alkyl group having 1 to 15 carbon atoms; a (meth)acrylic acid ester-based monomer which includes a hydroxy group, a carboxyl group, and an amine group; and a combination thereof.

The photoinitiator may absorb light with a wavelength of about 100 nm to about 400 nm.

Another exemplary embodiment of the present invention provides an acrylic syrup which does not include a molecular weight adjusting agent, and is prepared by means of bulk photopolymerization by the acrylic syrup preparation method.

The acrylic syrup may include an acrylic polymer having a weight average molecular weight of about 1,000,000 g/mol to about 20,000,000 g/mol.

The acrylic polymer may have a polydispersity index of about 1.98 to about 10.

The acrylic syrup may have a conversion rate of about 4% to about 20%.

Further, the acrylic syrup may have a viscosity of about 1,000 cps to about 100,000 cps at about 20° C.

Advantageous Effects

The acrylic syrup preparation method may implement excellent eco-friendliness, excellent productivity, excellent storage stability, excellent surface appearance, and uniform performance.

BRIEF DESCRIPTION OF DRAWINGS

FIG. 1 is a schematic process flow chart of an acrylic syrup preparation method according to an exemplary embodiment of the present invention.

BEST MODE

Hereinafter, exemplary embodiments of the present invention will be described in detail. However, the exemplary embodiments are suggested as an example, the present invention is not limited thereby, and the present invention is defined only by the scope of the claims to be described below.

An exemplary embodiment of the present invention provides an acrylic syrup preparation method including the steps of: performing bulk photopolymerization by initiating a UV irradiation of a composition containing a photoinitiator and one or more types of acrylic monomers; stopping the UV irradiation at the time point when the temperature is increased by about 5° C. to about 40° C. from the time point when the temperature at which the UV irradiation of the composition is initiated; and purging the composition with an oxygen-containing inert gas after the UV irradiation is stopped.

Typically, the bulk polymerization does not discharge volatile organic compounds, and the like, and examples of the bulk polymerization include bulk thermal polymerization in which a bulk polymerization reaction is initiated by heat or bulk photopolymerization in which a bulk polymerization reaction is initiated by light.

In the case of the bulk thermal polymerization, the productivity deteriorates more due to the relatively slow reaction rate, and the storage stability is low because the polymerization is continuously performed to some degree at normal temperature even after the temperature is lowered, and as a result, physical properties may slowly vary.

Thus, in the case of using the bulk photopolymerization, the productivity is high due to the fast reaction rate, and the storage stability over the temperature is excellent because the polymerization is not performed any more at normal temperature when light is blocked, but since the reaction may explosively occur and it is difficult to uniformly prepare an acrylic syrup having a desired level of conversion rate, a molecular weight adjusting agent and the like have been essentially used in order to solve the problems.

However, since the molecular weight adjusting agent and the like remain in the prepared acrylic syrup, and still remain even after the acrylic syrup as, for example, an adhesive film, a protective coating, and a foam is applied to a product, there occurs a migration phenomenon in which a molecular weight adjusting agent having fluidity and the like migrate to a surface of the product, and since residue of an adhesive, dirt, and the like may be generated, there is a problem in that the surface appearance and the performance of the product may deteriorate.

Thus, by using an acrylic syrup preparation method according to an exemplary embodiment of the present invention, it is possible to prepare, at a uniform level, an acrylic syrup which prevents the reaction from explosively occurring by appropriately controlling a rate of change in temperature from the time point when the UV irradiation is initiated, and has a desired level of conversion rate, even without including a molecular weight adjusting agent and the like.

Further, since the preparation method includes the step of purging the composition with an oxygen-containing inert gas, even when the prepared acrylic syrup is exposed to light and radicals are produced from a photoinitiator, the radicals may be reacted with oxygen present in the acrylic syrup and consumed, and accordingly, the polymerization reaction is not performed, and as a result, the acrylic syrup prepared by the preparation method has an advantage in that the storage stability over not only the temperature, but also light is more excellent.

As a result, the preparation method may implement excellent eco-friendliness, excellent productivity, and excellent storage stability by using bulk photopolymerization and may implement excellent surface appearance and uniform performance because the preparation method does not include a molecular weight adjusting agent.

FIG. 1 illustrates a schematic process flow chart of the preparation method.

The preparation method includes the steps of: performing bulk photopolymerization by initiating a UV irradiation of a composition containing a photoinitiator and one or more types of acrylic monomers (S1); stopping the UV irradiation at the time point when the temperature is increased by about 5° C. to about 40° C. from the time point when the temperature at which the UV irradiation of the composition is initiated (S2); and purging the composition with an oxygen-containing inert gas after the UV irradiation is stopped (S3).

In the preparation method, bulk photopolymerization may be performed by initiating a UV irradiation of a composition containing a photoinitiator and one or more types of acrylic monomers. The preparation method is eco-friendly because volatile organic solvents and the like are not discharged by using bulk photopolymerization, and has high preparation efficiency because the reaction rate of the bulk photopolymerization is faster than that of bulk thermal polymerization, and as a result, the productivity may be further improved. In addition, since the polymerization is not performed any more from the time point when the UV irradiation is stopped, physical properties of the prepared acrylic syrup may be maintained at a more consistent level, and as a result, the storage stability over the temperature may be effectively improved.

The composition may not include a molecular weight adjusting agent, and accordingly, a molecular weight adjusting agent is not included in a prepared acrylic syrup, and as a result, there does not occur a migration phenomenon in which a molecular weight adjusting agent having fluidity and the like migrate to a surface, and residue of an adhesive, dirt, and the like are generated, and accordingly, the surface appearance is excellent and the performance of a product may be implemented at a uniform level for a long period of time.

The molecular weight adjusting agent means including all the molecular weight adjusting agents publicly known in the art, and may include, for example, dodecyl mercaptan, isodecyl mercaptan, and the like, and is not limited thereto.

In the preparation method, the composition may be prepared by mixing the photoinitiator in an amount of about 0.001 part by weight to about 1 part by weight based on about 100 parts by weight of the one or more types of acrylic monomers.

Since the reaction is prevented from explosively occurring by including the photoinitiator in a content within the range to appropriately generate radicals required for bulk photopolymerization, the conversion rate of the acrylic monomer may be easily controlled.

The one or more types of acrylic monomers may include at least one selected from the group consisting of, for example, a (meth)acrylic acid ester-based monomer which includes an alkyl group having 1 to 15 carbon atoms; a (meth)acrylic acid ester-based monomer which includes a hydroxy group, a carboxyl group, and an amine group; and a combination thereof.

Specifically, the one or more types of acrylic monomers may include at least one selected from the group including methyl (meth)acrylate, ethyl (meth)acrylate, n-propyl (meth)acrylate, isopropyl (meth)acrylate, n-butyl (meth)acrylate, t-butyl (meth) acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate, tetradecyl (meth)acrylate, 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol (meth)acrylate or 2-hydroxypropylene glycol (meth)acrylate, methacrylic acid, acrylic acid, and a combination thereof.

The photoinitiator may absorb light with a wavelength of about 100 nm to about 400 nm. Radicals are easily formed by means of UV irradiation by absorbing light with a wavelength within the range, and as a result, the polymerization may be effectively performed.

The photoinitiator may include at least one selected from the group consisting of, for example, 2-methyl-1-[4-(methylthio)phenyl]-2-morpholino-propan-1-one, diphenyl-(2,4,6-trimethylbenzoyl)-phosphine oxide, benzyl dimethyl ketal, 2-hydroxy-2-methyl-1-phenyl-propan-1-one, 1-hydroxy-cyclohexylphenyl-ketone, benzophenone, 4-benzoyl-4'-methyldiphenyl sulfide, methyl-2-benzoyl benzoate, isopropylthioxanthone, ethyl-4-(dimethylamino)benzoate, 2-ethylhexyl-4-dimethylaminobenzoate, hydroxy dimethyl acetophenone, 2,4-diethylthioxanthone, 4-phenylbenzophenone, and a combination thereof.

In the preparation method, the UV irradiation may be stopped at the time point when the temperature is increased by about 5° C. to about 40° C. from the time point when the temperature at which the UV irradiation of the composition is initiated.

Since the bulk photopolymerization is an exothermic reaction, the temperature may be increased as the reaction is performed, and as the time elapses, the reaction is explosively performed while the temperature is sharply increased, and as a result, the danger may be increased.

As described above, the preparation method has an advantage in that a rate of change in temperature from the time point when the UV irradiation is initiated is appropriately controlled, and as a result, it is possible to prepare, at a uniform level, an acrylic syrup which prevents the reaction from explosively occurring and has a desired level of conversion rate, even without including a molecular weight adjusting agent and the like.

Furthermore, in the preparation method, a nitrogen purging of the composition may be started and carried out from before the UV irradiation is initiated. Accordingly, since oxygen present in the composition is replaced with nitrogen, so that radicals and the like generated from a photoinitiator by means of UV irradiation cannot be reacted with oxygen, the radicals are not consumed, and as a result, the polymerization reaction may be efficiently performed.

Further, stirring may be carried out at least while the composition is purged with nitrogen. As described above, oxygen in the composition may be more easily replaced with nitrogen by carrying out the stirring simultaneously, and as a result, the polymerization reaction may be more efficiently performed.

The nitrogen purging and stirring of the composition may be continuously performed until the time point when the UV irradiation is stopped, that is, when the reaction is completed, and may be performed even after the UV irradiation is stopped, if necessary.

In the preparation method, the temperature of the composition may be set to about −10° C. to about 80° C. at the time point when the UV irradiation is initiated. The weight average molecular weight of the acrylic polymer formed by the bulk photopolymerization may be appropriately adjusted at a desired level by setting the temperature within the range, and when the temperature of the composition is set at a low level, the weight average molecular weight of the acrylic polymer formed by the bulk photopolymerization may be implemented at a relatively large level.

The bulk photopolymerization may be performed from the time point when the UV irradiation is initiated to the time point when the UV irradiation is stopped, and accordingly, the acrylic monomer may be polymerized at a conversion rate of about 4% to about 20% until the time point when the UV irradiation is stopped. As the acrylic monomer is polymerized at a conversion rate at a low level within the range, the degree to which the prepared acrylic syrup is photo-cured may be adjusted within a much wider range during the post-process of applying the acrylic syrup to a product, and accordingly, various physical properties may be imparted by variously applying the conditions of photo-curing when the acrylic syrup is applied to a product.

When the conversion rate is less than about 4%, another additional compound needs to be further mixed and used because the performance as an acrylic syrup may not be sufficiently exhibited, and when the conversion rate is more than about 20%, the curing conditions cannot be variously adjusted due to a high content of the solid content and a high viscosity.

Further, the bulk photopolymerization may be performed from the time point when the UV irradiation is initiated to the time point when the UV irradiation is stopped, and accordingly, an acrylic polymer having a weight average molecular weight of about 1,000,000 g/mol to about 20,000,000 g/mol may be formed by the bulk photopolymerization until the time point when the UV irradiation is stopped. As described above, the weight average molecular weight of the acrylic polymer may be appropriately adjusted to the range by setting the temperature at the time point when the UV irradiation is initiated to about −10° C. to about 80° C., and accordingly, the acrylic polymer may be applied for various uses, such as, for example, an OCA adhesive film, an acrylic foam, an industrial adhesive film, and an adhesive film for home appliances, by appropriately adjusting the viscosity of the acrylic syrup.

The acrylic polymer may be an acrylic resin.

In an exemplary embodiment, the composition may be purged with an oxygen-containing inert gas after the UV irradiation is stopped.

Accordingly, since oxygen may be dissolved and included in the acrylic syrup prepared by the preparation method as described above, when the acrylic syrup is exposed to light such as UV rays, so that radicals are produced from a photoinitiator, the radicals may be reacted with oxygen dissolved in the acrylic syrup and consumed.

As described above, because the radicals are consumed, even though the acrylic syrup prepared by the preparation method is exposed to light such as UV rays, the polymerization reaction is not performed any more, and as a result, the storage stability over not only the temperature, but also light is excellent, and accordingly, even though the acrylic syrup is subjected to a process of distributing products, the acrylic syrup may maintain more constant physical properties until the acrylic syrup is applied to an actual product, regardless of a change in temperature and whether the acrylic syrup is exposed to light.

The oxygen-containing inert gas may contain oxygen in an amount of about 10 vol % to about 30 vol %. Since the time for purging may be reduced by containing the oxygen-containing inert gas in a content within the range, and as a result, explosiveness is prevented while reducing time and costs, excellent economic efficiency and excellent stability may be simultaneously implemented.

Further, the oxygen-containing inert gas may include at least one selected from the group including nitrogen, argon, helium, neon, and a combination thereof.

Stirring may be carried out at least while the composition is purged with an oxygen-containing inert gas. Accordingly, when the prepared acrylic syrup is exposed to light by sufficiently uniformly dissolving oxygen in the acrylic syrup, the polymerization reaction may be effectively suppressed from being performed.

In the preparation method, the composition may be purged with an oxygen-containing inert gas until the time point when the temperature of the composition reaches at least about 20° C. to about 50° C., and the composition may be purged with an oxygen-containing inert gas even after the temperature reaches about 20° C.

Since bulk photopolymerization, which is an exothermic reaction, is stopped from the time point when the UV irradiation is stopped, the temperature is lowered during the procedure of purging the composition, oxygen may be sufficiently dissolved in the composition without being discharged to the atmosphere only when purging needs to be continuously carried out until the time point when the temperature reaches at least a temperature within the range, and accordingly, when the composition is exposed to light, radicals produced may be sufficiently consumed, and as a result, the storage stability over light may be excellent.

Another exemplary embodiment of the present invention provides an acrylic syrup which does not include a molecular weight adjusting agent, and is prepared by means of bulk photopolymerization by the acrylic syrup preparation method.

Even though the acrylic syrup is prepared by means of bulk photopolymerization by the preparation method, the composition does not include a molecular weight adjusting agent, and as a result, when the acrylic syrup is applied for various uses, there does not occur a migration phenomenon in which a molecular weight adjusting agent having fluidity and the like migrate to a surface, and residue of an adhesive, dirt, and the like are not generated, and accordingly, the surface appearance is excellent and the performance of a product may be implemented at a uniform level for a long period of time.

Furthermore, the acrylic syrup is prepared by the bulk photopolymerization, and as a result, excellent eco-friendliness, excellent productivity, and excellent storage stability may be implemented, as described above.

Accordingly, even though the acrylic syrup is subjected to a process of distributing products, the acrylic syrup may maintain more constant physical properties until the acrylic syrup is applied to an actual product, regardless of a change in temperature and whether the acrylic syrup is exposed to light.

The molecular weight adjusting agent means including all the molecular weight adjusting agents publicly known in the art, and may include, for example, dodecyl mercaptan, isodecyl mercaptan, and the like, and is not limited thereto.

The acrylic syrup may include one or more acrylic monomers, an acrylic polymer having a weight average molecular weight of about 1,000,000 g/mol to about 20,000,000 g/mol, and a photoinitiator.

The acrylic polymer may be formed by polymerizing the one or more acrylic monomers as described in an exemplary embodiment. The acrylic polymer has a weight average molecular weight within the range, and as a result, the viscosity of the acrylic syrup is appropriately adjusted, and accordingly, the acrylic polymer may be applied for various uses such as, for example, an OCA adhesive film, an acrylic foam, an industrial adhesive film, and an adhesive film for home appliances.

Further, the acrylic polymer may have a polydispersity index (PDI) of about 1.98 to about 10. The acrylic polymer has a polydispersity index within the range, and as a result, the viscosity of the acrylic syrup is appropriately adjusted, and accordingly, when the acrylic polymer may be applied to a product, physical properties including adhesive performance and the like may be easily implemented at an excellent level.

The polydispersity index (Mw/Mn) may be defined as a value obtained by dividing the weight average molecular weight (Mw) by the number average molecular weight (Mn).

The acrylic syrup may have a conversion rate of about 4% to about 20%, that is, the acrylic monomer may be polymerized at a conversion rate of about 4% to about 20%. As the acrylic monomer is polymerized at a conversion rate at a low level within the range, the degree to which the prepared acrylic syrup is photo-cured may be adjusted within a much wider range during the post-post of applying the acrylic syrup to a product, and accordingly, various physical properties may be imparted by variously applying the conditions of photo-curing when the acrylic syrup is applied to a product.

The acrylic syrup may have a viscosity of about 1,000 cps to about 100,000 cps at about 20° C. As the acrylic syrup has a viscosity within the range, the acrylic syrup may be more uniformly mixed with other additives and the like in a post-process of applying the acrylic syrup to a product, and may even more easily form, for example, a film, a coating, a foam, and the like.

Hereinafter, Examples of the present invention will be described. However, the following Examples are only an Example of the present invention, and the present invention is not limited to the following Examples.

EXAMPLES

Example 1

A composition was prepared by mixing 100 parts by weight of an acrylic monomer including ethylhexyl acrylate (EHA) and acrylic acid (AA) and 0.05 part by weight of a photoinitiator IRG 184, the composition was formed at 25° C., and then the composition was purged with nitrogen for 1 hour while being stirred. Subsequently, a UV irradiation of 40 mW/cm$^2$ onto the composition was initiated by using a metal halide lamp while continuously carrying out the stirring and purging, and the temperature at which the UV irradiation was initiated was 25° C. When the temperature was increased by 15° C. from the time point when the temperature at which the UV irradiation was initiated while the temperature of the composition was continuously measured, the UV irradiation was stopped and the nitrogen purging was also stopped. Subsequently, an acrylic syrup was prepared by purging the composition with an oxygen-containing inert gas (oxygen: 15 vol % and nitrogen: 85 vol %) until the time point when the temperature of the composition reached 30° C. while the composition was continuously stirred. The purging of the oxygen-containing inert gas was stopped and the stirring was also stopped.

Comparative Example 1 (when a Molecular Weight Adjusting Agent is Included)

A composition was prepared by mixing 100 parts by weight of an acrylic monomer including ethylhexyl acrylate (EHA) and acrylic acid (AA), 0.05 part by weight of a photoinitiator IRG 184, and 0.005 part by weight of a molecular weight adjusting agent n-dodecyl mercaptan, and an acrylic syrup was prepared by irradiating a UV ray of 40 mW/cm$^2$ onto the composition for 5 minutes by using a metal halide lamp.

Comparative Example 2 (when Bulk Thermal Polymerization is Used)

A composition was prepared by mixing 100 parts by weight of an acrylic monomer including ethylhexyl acrylate (EHA) and acrylic acid (AA) and 0.005 part by weight of a thermal initiator AIBN, and an acrylic syrup was prepared by means of bulk thermal polymerization by performing a heat treatment at 80° C. for 5 hours.

Comparative Example 3 (when a Rate of Change in Temperature is Less than a Predetermined Value)

An acrylic syrup was prepared in the same conditions and manner as in Example 1, except that the UV irradiation was stopped at the time point when the temperature was increased by 4° C. from time point when the temperature at which the UV irradiation was initiated.

Comparative Example 4 (when a Rate of Change in Temperature is More than a Predetermined Value)

An acrylic syrup was prepared in the same conditions and manner as in Example 1, except that the UV irradiation was stopped at the time point when the temperature was increased by 50° C. from the time point when the temperature at which the UV irradiation was initiated.

Evaluation

For the acrylic syrups in Example 1 and Comparative Examples 1 to 4, each physical property was evaluated, and is shown in the following Table 1. Further, the weight average molecular weight and polydispersity index of the acrylic polymer included in each acrylic syrup were measured, and are shown in the following Table 2.

EXPERIMENTAL EXAMPLES

Experimental Example 1: Conversion Rate

Measurement method: 10.000 g of each of the acrylic syrups in Example 1 and Comparative Examples 1 to 4 was added dropwise to methanol, the acrylic polymer precipitated in the methanol was filtered, and then dried under the conditions of 60° C. and 24 hours in a vacuum oven, and subsequently, the mass of a solid content dried and formed was measured. The conversion rate was calculated according to the following Equation 1 by using the mass of the solid content.

$$\text{Conversion rate (\%)} = M_2/M_1 \times 100 \quad \text{[Equation 1]}$$

In Equation 1, $M_1$ is a mass of the acrylic syrup added dropwise to methanol, and $M_2$ is a mass of the solid content dried and formed.

Experimental Example 2: Viscosity

Measurement method: The viscosity was measured by using a viscometer (Brookfield, DV-II+ Pro) under the conditions of 20° C.

Experimental Example 3: Storage Stability Over Temperature

Measurement method: Each acrylic syrup was maintained in a high-temperature chamber (JEIO Tech Co., Ltd., ON-22) at 60° C. for 24 hours, and then it was measured whether there is a change in conversion rate, and a case where there is no change in conversion rate was marked with "O" and a case where the conversion rate was increased was marked with "X".

Experimental Example 4: Storage Stability Over Light

Measurement method: Each acrylic syrup was exposed to solar light (10 mw/cm$^2$ or more based on UVA) for 10 minutes, and then it was measured whether there is a change in conversion rate, and a case where there is no change in conversion rate was marked with "O" and a case where the conversion rate was increased was marked with "X".

Experimental Example 5: Surface Appearance and Whether Uniform Performance can be Implemented Measurement method: Each acrylic acid was deaerated, and subsequently, an adhesive film was prepared by applying the acrylic syrup on a polyethylene terephthalate (PET) base film, and then irradiating UV rays thereon to photo-cure the film, the adhesive film was left to stand for 120 hours, and then it was observed by the unaided eye whether residue of the adhesive, dirt, and the like are generated on the surface of the adhesive film, a case where the adhesive performance was uniformly maintained because residue of the adhesive, dirt, and the like were not generated was marked with "O" and a case where the adhesive performance deteriorated because residue of the adhesive, dirt, and the like were generated, or the film shape was not completely implemented because the viscosity of the acrylic syrup itself, and the like were not appropriate was marked with "X".

Experimental Example 6: Weight Average Molecular Weight and Polydispersity Index Measurement method: Each solid content was dissolved at a concentration of 0.25 wt % in chloroform, and the weight average molecular weight and the number average molecular weight were measured by using a gel permeation chromatography (Manufacturer: Agilent Technologies 1200, Column: Mixed-A*2 ea, PLgel 10 μm Guard*1 ea, and Detector: RID). Subsequently, the molecular weight distribution (Mw/Mn) was calculated by dividing the measured weight average molecular weight (Mw) by the measured number average molecular weight (Mn).

Flow rate: 1.0 mL/min, Solvent: THF, and Standard material: polystyrene

TABLE 1

| | Conversion rate (%) | Viscosity (cps) | Storage stability over temperature | Storage stability over light | Surface appearance and whether uniform performance is implemented |
|---|---|---|---|---|---|
| Example 1 | 9.71 | 12000 | O | O | O |
| Comparative Example 1 | 9.22 | 1600 | O | X | X |
| Comparative Example 2 | 24.12 | 2400 | X | X | o |
| Comparative Example 3 | 2.12 | 400 | O | X | X |
| Comparative Example 4 | 31.15 | Cannot be measured | O | X | X |

TABLE 2

| | Weight average molecular weight (g/mol) | Polydispersity |
|---|---|---|
| Example 1 | 2,890,000 | 2.12 |
| Comparative Example 1 | 1,800,000 | 3.15 |
| Comparative Example 2 | 620,000 | 3.20 |
| Comparative Example 3 | 2,920,000 | 2.03 |
| Comparative Example 4 | 2,720,000 | 4.28 |

Both the weight average molecular weight and polydispersity index of the acrylic polymer included in the acrylic syrup according to Example 1 are appropriate and the conversion rate and the viscosity of the acrylic syrup are also appropriate, and as a result, the degree to which the prepared acrylic syrup is photo-cured may be adjusted within a much wider range during the process of applying the acrylic syrup to a product, and accordingly, it can be clearly confirmed that various physical properties may be imparted by variously applying the conditions of photo-curing when the acrylic syrup to a product. Further, the acrylic syrup according to Example 1 has excellent storage stability over temperature by stopping the polymerization by blocking light, and particularly, since the acrylic syrup does not include a molecular weight adjusting agent, there does not occur a migration phenomenon of the molecular weight adjusting agent, so that residue of the adhesive, dirt, and the like are not generated, and accordingly, the surface appearance is excellent and a uniform performance may be implemented.

In particular, the acrylic syrup according to Example 1 has an advantage in that polymerization is not performed even though the acrylic syrup is exposed to light, and as a result, the storage stability over light is also excellent.

In contrast, since the acrylic syrup according to Comparative Example 1 included a molecular weight adjusting agent, there occurred a migration phenomenon of the molecular weight adjusting agent after the acrylic syrup was applied as a product, and as a result, residue of the adhesive, dirt, and the like were generated, and accordingly, it was clearly confirmed that the surface appearance was poor and the performance deteriorated.

Further, in the acrylic syrup according to Comparative Example 2, the polymerization was slowly performed even after the heat treatment was stopped, and as a result, the conversion rate was changed, and accordingly, it was clearly confirmed that the storage stability over the temperature was significantly poor.

Furthermore, in the case of the acrylic syrup according to Comparative Example 3, the conversion rate and the viscosity were so low that there was a problem in that the acrylic syrup flowed down, and the like, and in the case of the acrylic syrup according to Comparative Example 4, the conversion rate and the viscosity were so high that there is a problem in that the acrylic syrup aggregated, and as a result, it is difficult to form a coating, and during the process of applying the acrylic syrups to a product, for example, a film shape and the like could not be easily implemented, and as a result, the surface appearance was poor and the performance failed to be uniformly implemented in each portion of the film. In addition, in the case of Comparative Example 4, an acrylic monomer may be additionally added in order to solve the above-described problem, but the addition process is so complicated that a lot of time and costs are consumed, and as a result, Comparative Example 4 is economically inefficient.

The invention claimed is:

1. An acrylic syrup preparation method, comprising the steps of:
    performing bulk photopolymerization by initiating a UV irradiation of a composition containing a photoinitiator and one or more types of acrylic monomers;
    stopping the UV irradiation at the time point when the temperature is increased by about 5° C. to about 40° C. from the time point when the temperature at which the UV irradiation of the composition is initiated; and
    purging the composition with an oxygen-containing inert gas after the UV irradiation is stopped,
    wherein the composition does not comprise a molecular weight adjusting agent.

2. The acrylic syrup preparation method of claim 1, wherein the oxygen-containing inert gas contains oxygen in an amount of about 10 vol % to about 30 vol %.

3. The acrylic syrup preparation method of claim 1, wherein stirring is carried out at least while the composition is purged with the oxygen-containing inert gas.

4. The acrylic syrup preparation method of claim 1, wherein the composition is purged with the oxygen-containing inert gas until the time point when the temperature of the composition reaches at least about 20° C. to about 50° C.

5. The acrylic syrup preparation method of claim 1, wherein the acrylic monomers is polymerized at a conversion rate of about 4% to about 20% until the time point when the UV irradiation is stopped.

6. The acrylic syrup preparation method of claim 1, wherein an acrylic polymer having a weight average molecular weight of about 1,000,000 g/mol to about 20,000,000 g/mol is formed by the bulk photopolymerization until the time point when the UV irradiation is stopped.

7. The acrylic syrup preparation method of claim 1, wherein a nitrogen purging of the composition is started and carried out from before the UV irradiation is initiated.

8. The acrylic syrup preparation method of claim 7, wherein stirring is carried out at least while the composition is purged with nitrogen.

9. The acrylic syrup preparation method of claim 1, wherein the temperature of the composition is set to about −10° C. to about 80° C. when the time point when the UV irradiation is initiated.

10. The acrylic syrup preparation method of claim 1, further comprising: the step of preparing the composition by mixing the photoinitiator in an amount of about 0.001 part by weight to about 1 part by weight based on about 100 parts by weight of the one or more types of acrylic monomers.

11. The acrylic syrup preparation method of claim 1, wherein the one or more types of acrylic monomers comprise one selected from the group consisting of a (meth) acrylic acid ester-based monomer which comprises an alkyl group having 1 to 15 carbon atoms; a (meth)acrylic acid ester-based monomer which comprises a hydroxy group, a carboxyl group, and an amine group; and a combination thereof.

12. The acrylic syrup preparation method of claim 1, wherein the photoinitiator absorbs light with a wavelength of about 100 nm to about 400 nm.

13. An acrylic syrup which does not comprises a molecular weight adjusting agent, and is prepared by means of bulk photopolymerization by the acrylic syrup preparation method according to claim 1.

14. The acrylic syrup of claim 13, wherein the acrylic syrup comprises an acrylic polymer having a weight average molecular weight of 1,000,000 g/mol to 20,000,000 g/mol.

15. The acrylic syrup of claim 13, wherein the acrylic polymer has a polydispersity index of 1.98 to 10.

16. The acrylic syrup of claim 13, wherein the acrylic syrup has a conversion rate of 4% to 20%.

17. The acrylic syrup of claim 13, wherein the acrylic syrup has a viscosity of 1,000 cps to 100,000 cps at 20° C.

\* \* \* \* \*